C. Welte,

Meat Cutter.

Nº 77,143.　　　Patented Apr. 21, 1868.

Witnesses:
W. C. Ashketter
Wm Dean Torell

Inventor:
Chas Welte
per Munn & Co
Attorneys

United States Patent Office

CHARLES WELTE, OF FRANKFORD, PENNSYLVANIA.

Letters Patent No. 77,143, dated April 21, 1868.

---

IMPROVED MEAT-CUTTER.

---

*The Schedule referred to in these Letters Patent and making part of the same.*

---

TO ALL WHOM IT MAY CONCERN:

Be it known that I, CHARLES WELTE, of Frankford, in the county of Philadelphia, and State of Pennsylvania, have invented a new and useful Improvement in Sausage-Meat Chopper; and I do hereby declare that the following is a full, clear, and exact description thereof, which will enable others skilled in the art to make and use the same, reference being had to the accompanying drawings, forming part of this specification.

Similar letters of reference indicate corresponding parts.

My invention has for its object to furnish an improved machine for cutting or chopping sausage-meat, which shall be simple in construction, easily operated, and effective in operation; and it consists in the construction, combination, and arrangement of the various parts, as hereinafter more fully described.

Figure 1:
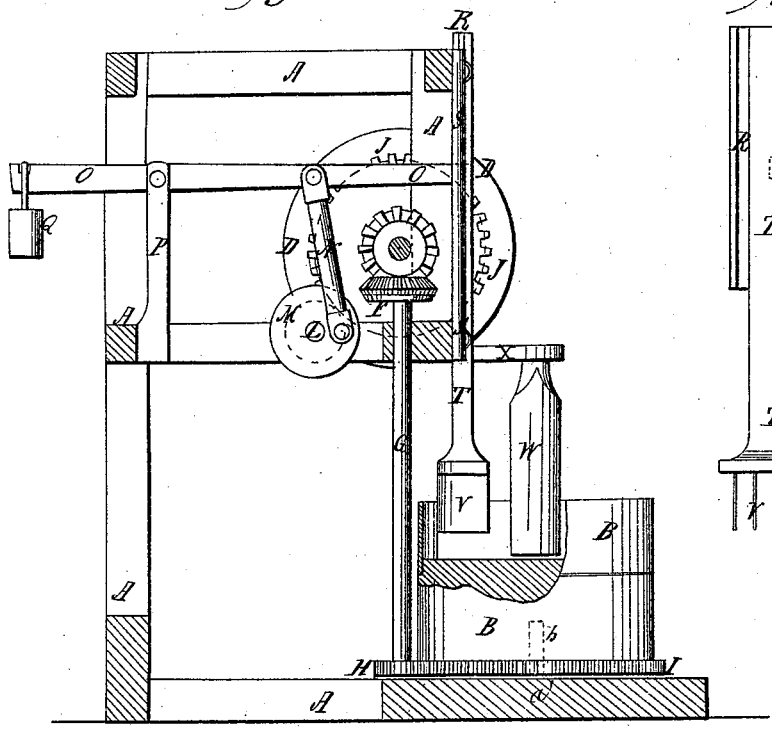
Figure 1 is a vertical section of my improved machine, taken through the line $x\,x$, fig. 2.
Figure 3:
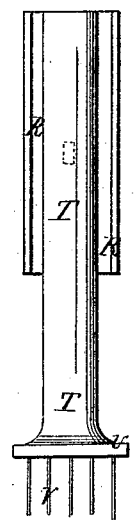
Figure 3 is a detail front view of the cutter-slide and knives.
Figure 2:
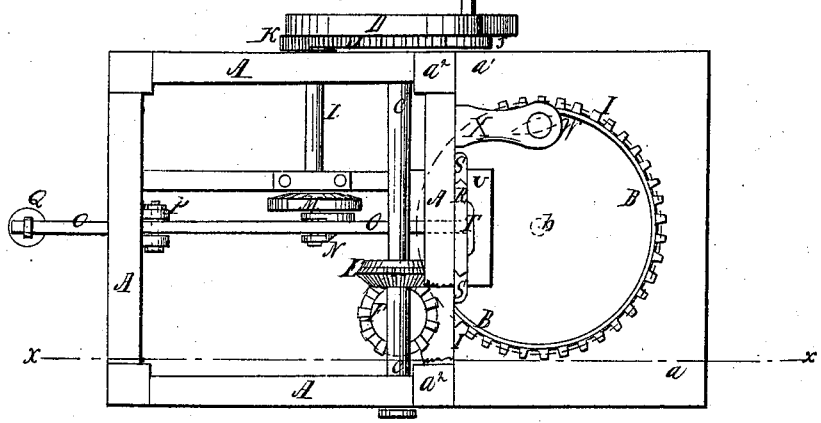
Figure 2 is a top view of the same.

A is the frame of the machine, the foundation part of which extends out in front, and has a platform, $a^1$, formed upon it, for the reception of the meat-box B, which is pivoted to said platform by a pin, $b'$, as shown in figs. 1 and 2. C is a horizontal shaft, which revolves in bearings attached to the upper part of the front posts $a^2$ of the frame A.

To one end of the shaft C is attached the crank-wheel D, which is made sufficiently heavy to act as a fly-wheel. To the shaft D is attached a bevel-gear wheel, E, the teeth of which mesh into the teeth of the bevel-gear wheel F, attached to the upper end of the vertical shaft G, which revolves in bearings attached to the frame A. To the lower part of the vertical shaft G is attached a gear-wheel, H, the teeth of which mesh into the teeth of the gear-wheel I, attached to or formed upon the lower part of the meat-box B, so that the said meat-box may be slowly and constantly revolved, to continually present a different part of the meat to the action of the knives or cutters. J is a gear-wheel, attached to or formed upon the inner side of the crank-wheel D, as shown in figs. 1 and 2, into the teeth of which mesh the teeth of the gear-wheel K, attached to the end of the short horizontal shaft L. The shaft L revolves in bearings attached to the frame A, and to its inner end is attached the crank or crank-wheel M, to the crank-pin of which is pivoted the lower end of the connecting-rod N, the upper end of which is pivoted to the lever O. The lever O is pivoted to a standard, P, or other support attached to the frame A. The rear end of the lever O projects in the rear of the machine, and from it is suspended a balance-weight, Q, as shown in figs. 1 and 2. The forward end of the lever O enters a slot or socket formed in or attached to the rear side of the slide R, so as to move the said slide up and down by the movement of the said lever. The side edges of the slide R are made V-shaped, and move up and down in grooves or guides, S, formed in or attached to the frame A. To the slide R is attached, or upon it is formed, a bar or arm, T, to the downwardly-projecting lower end of which is attached, or upon it is formed, the cutter-head U, to which the knives or cutters V are attached. By this construction the knives or cutters will be raised and lowered alternately, while at the same time the meat-box will be slowly revolved, so that the knives will descend each time in a different place. W is a knife or scraper, the upper end of which is attached to an arm, X, attached to and projecting from the frame A. The lower part of the knife W descends along the inner surface of the side of the meat-box B, to or nearly to the bottom of said box. The knife or scraper W is set obliquely, as shown in figs. 1 and 2, so that as the meat-box B is revolved, the said scraper may remove the meat from the side, and guide it towards the middle part of said box, into a more favorable position to be acted upon by the knives or cutters, V.

I claim as new, and desire to secure by Letters Patent—

The combination of the revolving meat-box B, gear-wheels I and H, vertical shaft G, bevel-gear wheels F and E, horizontal shaft C, crank-wheel D, gear-wheels J and K, short horizontal shaft L, crank or crank-wheel M, connecting-rod N, pivoted and balanced lever O, and slide R, to which the cutter T U V is attached, substantially as herein shown and described, and for the purpose set forth.

CHARLES WELTE.

Witnesses:
H. HELLERMAN,
CHEW BAIR.